United States Patent
Dhall et al.

(10) Patent No.: US 9,817,298 B1
(45) Date of Patent: Nov. 14, 2017

(54) CAMERA WITH AERODYNAMIC HOUSING

(71) Applicant: Emergent Systems Corporation, Dearborn, MI (US)

(72) Inventors: Sanjay Dhall, Canton, MI (US); Nathaniel Jachim, Detroit, MI (US)

(73) Assignee: Emergent Systems Corporation, Dearborn, MI (US)

( * ) Notice: Subject to any disclaimer, the term of this patent is extended or adjusted under 35 U.S.C. 154(b) by 0 days.

(21) Appl. No.: 15/404,243

(22) Filed: Jan. 12, 2017

(51) Int. Cl.
| | |
|---|---|
| G03B 17/02 | (2006.01) |
| H04N 5/225 | (2006.01) |
| H04N 5/232 | (2006.01) |
| G03B 17/56 | (2006.01) |
| G03B 15/00 | (2006.01) |

(52) U.S. Cl.
CPC ........... *G03B 17/02* (2013.01); *G03B 15/006* (2013.01); *G03B 17/561* (2013.01); *H04N 5/2252* (2013.01); *H04N 5/2253* (2013.01); *H04N 5/23216* (2013.01); *H04N 5/23296* (2013.01)

(58) Field of Classification Search
None
See application file for complete search history.

(56) References Cited

U.S. PATENT DOCUMENTS

| | | | |
|---|---|---|---|
| 2,906,181 A | 9/1959 | Hofstra | |
| 3,689,012 A | 9/1972 | Balmer Scott Liston | |
| 6,639,625 B1 * | 10/2003 | Ishida | H04N 1/0402 348/218.1 |
| 6,924,838 B1 | 8/2005 | Nieves | |
| 6,995,787 B2 | 2/2006 | Adams | |
| D690,344 S | 9/2013 | Hollinger | |
| 8,593,520 B2 | 11/2013 | Hong et al. | |
| 8,730,388 B2 | 5/2014 | Osborn | |
| 8,896,698 B2 | 11/2014 | Brester | |
| 9,237,317 B2 | 1/2016 | Hollinger | |
| 9,319,571 B2 | 4/2016 | Lyren et al. | |
| 2002/0196339 A1 | 12/2002 | Heafitz | |
| 2005/0122419 A1 * | 6/2005 | Yoon | H04N 5/2252 348/360 |
| 2007/0110430 A1 * | 5/2007 | Shi | G03B 17/02 396/428 |
| 2011/0110609 A1 | 5/2011 | Silverbrook et al. | |
| 2015/0002623 A1 * | 1/2015 | Masugi | H04N 5/23238 348/37 |
| 2015/0103237 A1 * | 4/2015 | Liu | H04N 5/2252 348/373 |
| 2016/0214536 A1 | 7/2016 | Burdge | |

* cited by examiner

*Primary Examiner* — W B Perkey
(74) *Attorney, Agent, or Firm* — Young Basile Hanlon & MacFarlane, P.C.

(57) ABSTRACT

A camera includes a primary housing that has a cylindrical exterior surface and an opening located at a front end. The camera also includes a rotatable housing that has a spherical exterior surface and an aperture, where the rotatable housing is disposed in the opening of the primary housing and is rotatably mounted to the primary housing. The camera also includes an image sensor that is located in the rotatable housing for rotation in unison with the rotatable housing, where the image sensor receives light through the aperture of the rotatable housing.

20 Claims, 6 Drawing Sheets

CAMERA WITH AERODYNAMIC HOUSING

TECHNICAL FIELD

This disclosure relates to cameras with aerodynamic housings.

BACKGROUND

Current consumer grade video cameras provide high quality video images. Some consumer grade cameras have small package sizes, allowing them to be mounted to user's bodies or to sporting equipment such as a bicycle. Among these are so-called "action cameras" that are often utilized for recording sporting events or activities from the perspective of a person involved in the activity.

SUMMARY

One aspect of the disclosed embodiments is a camera that includes a primary housing that has a cylindrical exterior surface and an opening located at a front end. The camera also includes a rotatable housing that has a spherical exterior surface and an aperture, where the rotatable housing is disposed in the opening of the primary housing and is rotatably mounted to the primary housing. The camera also includes an image sensor that is located in the rotatable housing for rotation in unison with the rotatable housing, where the image sensor receives light through the aperture of the rotatable housing.

The rotatable housing and the primary housing may be configured to provide a smooth geometric transition at the opening of the primary housing. The primary housing and the rotatable housing may cooperate to define a hemispherical shape. The primary housing may include an upper projection that is located above the rotatable housing and a lower projection that is located below the primary housing. A first mounting structure may extend downward from the upper projection and engages the rotatable housing, and a second mounting structure may extend upward from the lower projection and engages the rotatable housing. The first mounting structure may extend into a first opening of the rotatable housing and engage a first annular surface of the rotatable housing, and the second mounting structure may extend into a second opening of the rotatable housing and engage a second annular surface of the rotatable housing. The rotatable housing may be rotatable on a rotation axis that extends through the upper projection and the lower projection. The primary housing may extend longitudinally along a housing axis and the rotation axis may extend transverse to the housing axis. The camera may further include a camera control module, a first electrical connector that connects the camera control module to the image sensor, and a wiring route that is formed in the primary housing and extends through at least one of the first mounting structure or the second mounting structure. The camera may further include a drive mechanism that is located in the primary housing and is operable to cause rotation of the rotatable housing relative to the primary housing. The drive mechanism may include a wheel that is frictionally engaged with the spherical exterior surface of the rotatable housing. The drive mechanism may include a gear that is frictionally engaged with a gear track that is formed on the spherical exterior surface of the rotatable housing. The camera may further include a mounting assembly that includes a base part and a connecting part that is movable between a connected position and a disconnected position with respect to the base part. The connecting part includes a collar that is receivable in an annular depression that is formed in the cylindrical exterior surface of the primary housing.

Another aspect of the disclosed embodiments is a camera that includes a primary housing that has an exterior surface and an opening located at a front end, where the primary housing includes an upper projection that is located above the rotatable housing, a lower projection that is located below the primary housing, a first cylindrical mounting structure that extends downward from the upper projection, and a second cylindrical mounting structure that extends upward from the lower projection. The camera also includes a rotatable housing that has an exterior surface and an aperture, where the rotatable housing is disposed in the opening of the primary housing and is rotatably mounted to the primary housing by engagement with the first cylindrical mounting structure and the second cylindrical mounting structure, where the rotatable housing is rotatable on a rotation axis that extends through the upper projection and the lower projection. The camera also includes an image sensor that is located in the rotatable housing for rotation in unison with the rotatable housing, where the image sensor receives light through the aperture of the rotatable housing. The camera also includes a drive mechanism that is located in the primary housing and is operable to cause rotation of the rotatable housing relative to the primary housing. The camera also includes a camera control module that is electrically connected to the image sensor and the drive mechanism for controlling operation of the image sensor and the drive mechanism.

Another aspect of the disclosed embodiments is a camera that includes a primary housing that has a cylindrical exterior surface and an opening located at a front end. The camera also includes a rotatable housing that has a spherical exterior surface and an aperture, where the rotatable housing is disposed in the opening of the primary housing and is rotatably mounted to the primary housing, the rotatable housing and the primary housing are configured to provide a smooth geometric transition at the opening of the primary housing, and the primary housing and the rotatable housing cooperate to define a hemispherical shape. The camera also includes an image sensor that is located in the rotatable housing for rotation in unison with the rotatable housing, where the image sensor receives light through the aperture of the rotatable housing. The camera also includes a drive mechanism that is located in the primary housing and is operable to cause rotation of the rotatable housing relative to the primary housing. The camera also includes a camera control module that is electrically connected to the image sensor and the drive mechanism for controlling operation of the image sensor and the drive mechanism, and a mounting assembly that includes a base part and a connecting part that is movable between a connected position and a disconnected position with respect to the base part. The connecting part includes a collar that is receivable in an annular depression that is formed in the cylindrical exterior surface of the primary housing.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Mounting a camera to a vehicle, such as an airplane, an automobile, or a motorcycle, allows video to be captured during operation of the vehicle. When the vehicle is operated at high speed, the housing of the camera will add to the aerodynamic drag experienced by the vehicle.

The disclosure herein is direction to a camera having an aerodynamic housing that is intended to be mounted to a vehicle, such as an aircraft, so that a longitudinal axis of the aerodynamic housing is generally aligned with the direction of travel of the vehicle. The exterior surfaces of the housing are configured to produce lower amounts of aerodynamic drag than conventional designs. By way of example, the implementations described herein can have a housing that is less than six inches long and less than one inch in diameter. Some implementations of the camera also incorporate mounting features, camera orientation control, and stabilizing features.

Figure 1:
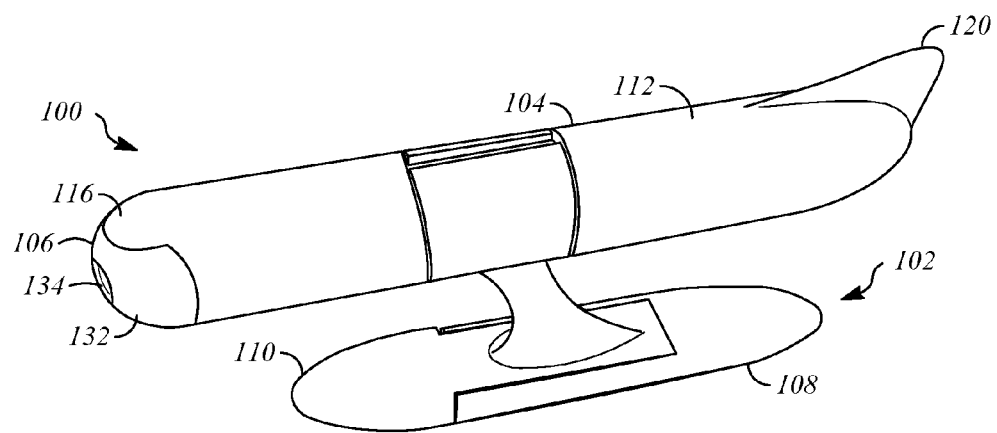
FIG. 1 is a perspective view of a camera and a mounting assembly.
Figure 2:
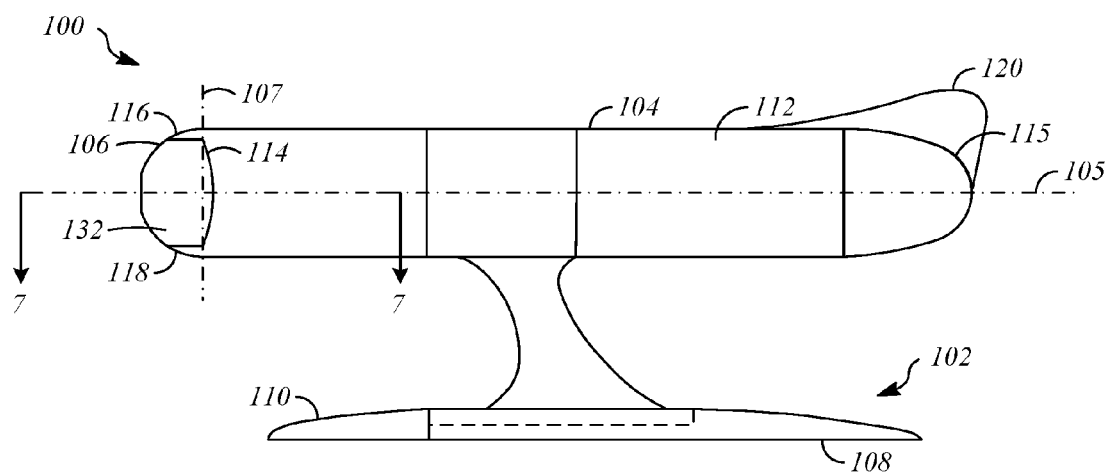
FIG. 2 is a side view of the camera and the mounting assembly.
Figure 3:
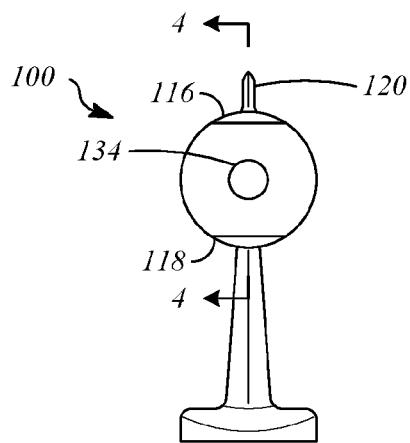
FIG. 3 is a front view of the camera and the mounting assembly.

FIGS. 1-3 show a camera 100 and a mounting assembly 102. The camera 100 includes a primary housing 104, and a rotatable housing 106. The mounting assembly 102 includes a base part 108 and a connecting part 110.

The primary housing 104 is a generally cylindrical structure that extends along a housing axis 105. The primary housing 104 has an exterior surface 112 that is generally smooth subject to deviations described herein, and defines a circular outer periphery for the exterior of the primary housing 104.

The primary housing includes an opening 114 that extends generally transverse to the housing axis 105 is located at a front end of the primary housing 104. A tapered portion 115 is located adjacent to a rear end of the primary housing 104. In the tapered portion 115, the nominal diameter of the exterior surface 112 of the primary housing 104 may decrease until reaching the rear end of the primary housing 104. By configuring the primary housing 104 such that the generally cylindrical shape of the primary housing 104 transitions to a progressively narrower diameter in the tapered portion 115 until reaching the rear end of the primary housing 104, aerodynamic drag is reduced.

The opening 114 of the primary housing 104 is configured to receive the rotatable housing 106 in a manner that allows the rotatable housing 106 to rotate relative to the primary housing 104 on a rotation axis 107. To connect the primary housing 104 to the rotatable housing 106, the primary housing 104 includes an upper projection 116 and a lower projection 118 that extend forward relative to the remainder of the primary housing 104 at the opening 114 such that the rotation axis 107 extends through the upper projection 116 and such that the rotation axis 107 extends through the lower projection 118. This configuration places the upper projection 116 and the lower projection 118 above and below the rotatable housing 106 in the top-to-bottom direction of the camera 100, such that the rotatable housing 106 is captured between the upper projection 116 and the lower projection 118, as will be explained further herein.

The primary housing 104 can include one or more external features such that interact with air flowing past the primary housing 104. These external features may function as stabilizing structures by, for example, steadying the primary housing 104 such that it remains oriented in the direction of travel of a structure to which it is connected, such as an aircraft. In the illustrated example, a fin 120 extends upward from the exterior surface 112 of the primary housing 104, is laterally centered relative to the remainder of the primary housing 104, and extends from an intermediate point along the longitudinal length of the primary housing 104 to the rear end of the primary housing 104. The sides of the fin 120 serve as opposed reaction surfaces that orient and steady the primary housing 104. Because the fin 120 has a relatively small frontal area, it does not add substantially to aerodynamic drag. Other structures with different configurations can be formed on or connected to the primary housing 104 to serve as stabilizing structures.

Figure 4:
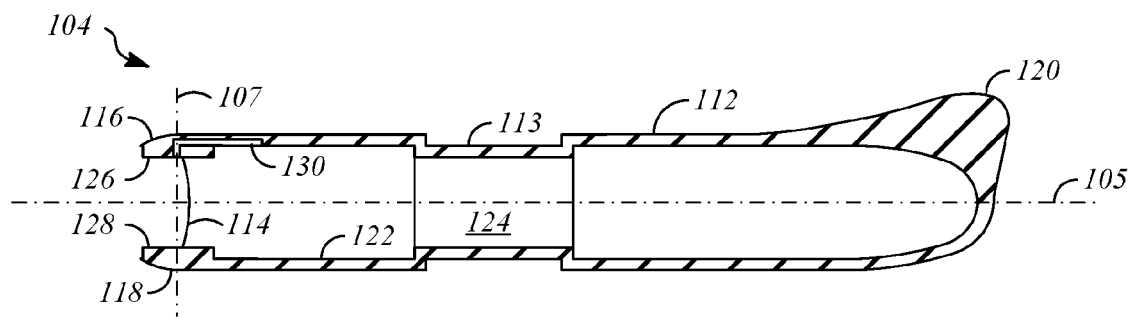
FIG. 4 is a side cross-section view showing a primary housing of the camera taken along line 4-4 of FIG. 3.

FIG. 4 is a cross-section view showing the primary housing 104 of the camera 100. The primary housing 104 defines an interior surface 122 and a hollow interior 124.

At the exterior surface 112 of the primary housing 104, an annular depression 113 is defined between the front and rear ends of the primary housing 104. The annular depression 113 may define a cylindrical portion of the primary housing 104 that is centered radially on the housing axis 105 but has a smaller radial dimension than the adjacent portions of the primary housing 104. The annular depression 113 allows connection of the primary housing 104 to the mounting assembly 102 while recessing portions of the mounting assembly 102 to define a smooth transition from the exterior surface 112 of the primary housing 104 to adjacent surface portions of the mounting assembly 102 (FIG. 1).

A first mounting structure 126 is formed on the interior surface 122 and extends downward from the upper projection 116. A second mounting structure 128 is formed on the interior surface 122 and extends upward from the lower projection 118. The first mounting structure 126 and the second mounting structure 128 may be cylindrical structures (e.g., a boss) that are centered radially on the rotation axis 107 and have annular surfaces that encircle the rotation axis 107. As will be explained herein, the first mounting structure 126 and the second mounting structure 128 connect the rotatable housing 106 to the primary housing 104, allow rotation of the rotatable housing 106 relative to the primary housing 104, and constrain rotation of the rotatable housing 106 to the rotation axis 107.

To allow electrical connections between components located in the primary housing 104 and components located in the rotatable housing 106, a wiring path 130 is formed in the primary housing. The wiring path 130 may be, as examples, a trough or tunnel that is formed in the wall of the primary housing 104 extending from a wiring path first end to a wiring path second end. The wiring path first end is in communication with the interior surface 122 of the primary housing 104 and is spaced rearward from one of the first mounting structure 126 or the second mounting structure 128. The wiring path second end extends through an end surface of one of the first mounting structure 126 or the second mounting structure 128 in order to allow electrical connectors to pass into the rotatable housing 106 without impeding rotation of the rotatable housing 106 with respect to the primary housing 104, as will be described further herein.

With further reference to FIGS. 1-3, the rotatable housing 106 is located at the front end of the primary housing 104, and is positioned in the opening 114 of the primary housing 104. The rotatable housing 104 has an exterior surface 132 that is generally spherical, but with the rotatable housing 106 incorporating certain deviations from a fully spherical shape. The primary housing 104 is configured such that the rotatable housing 106 meets the primary housing 104 at the opening 114, the upper projection 116, and the lower projection 118 to define a smooth transition from the rotatable housing 106 to the primary housing 104, without abrupt angular deviations. The primary housing 104 and the rotatable housing 106 cooperate to define a substantially hemispherical shape for the front end of the camera 100, in order to reduce aerodynamic drag.

Figure 5:
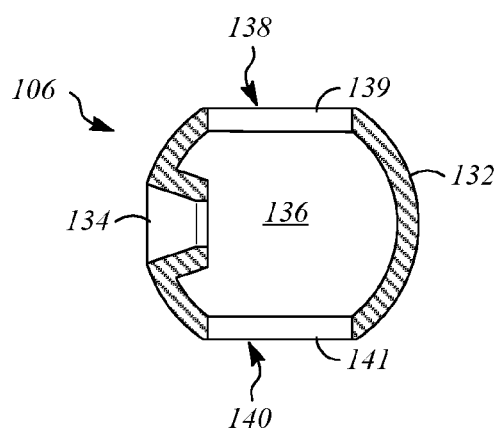
FIG. 5 is a side cross-section view showing a rotatable housing of the camera taken along line 4-4 of FIG. 3.

The rotatable housing 106 is best seen in FIG. 5, which is a side cross section view. The rotatable housing 106 includes an aperture 134. The aperture 134 is an opening that extends inward from the exterior surface 132 of the rotatable housing 106 to an interior 136 of the rotatable housing 106. The aperture 134 allows light to enter and reach internal components of the camera 100, as will be discussed herein.

At the top of the rotatable housing 106, a first circular opening 138 is formed through the rotatable housing 106 and is in communication with the interior 136 of the rotatable housing 106. The first circular opening 138 is bounded by a first annular surface 139. At the bottom of the rotatable housing 106, a second circular opening 140 is formed through the rotatable housing 106 and is in communication with the interior 136 of the rotatable housing 106. The second circular opening 140 is bounded by a second annular surface 141. The first annular surface 139 and the second annular surface 141 extend around a common axis, which is the rotation axis 107 when the rotatable housing 106 is assembled with respect to primary housing 104. In particular, the first mounting structure 126 is receivable in the first circular opening 138 and the second mounting structure 128 is receivable in the second circular opening 140. This places the first annular surface 139 in engagement with the first mounting structure 126 and places the second annular surface 141 in engagement with the second mounting structure 128 to allow and guide rotation of the rotatable housing 106 with respect to the primary housing 104.

Figure 6:
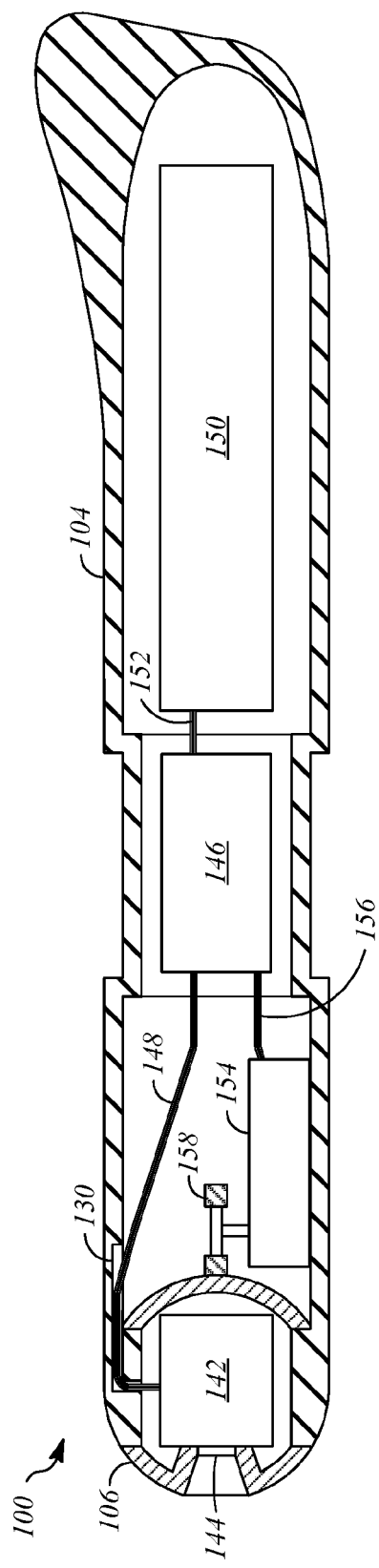
FIG. 6 is a side cross-section view showing the camera taken along line 4-4 of FIG. 3.

FIG. 6 is a side cross-section view showing the camera 100, including the primary housing 104, the rotatable housing 106, and internal components of the camera 100.

The camera 100 includes an image sensor 142 and a lens 144. The image sensor 142 is disposed in the interior 136 of the rotatable housing 106, and is fixed with respect to the rotatable housing 106 such that the image sensor 142 is able to rotate with the rotatable housing 106 relative to the primary housing 104.

The image sensor 142 may be any manner of image sensor now known or later developed that is able to output a signal representing electromagnetic energy, and in particular visible light, that is incident upon the image sensor 142. Suitable technologies that may be used to implement the image sensor 142 include charge-coupled device (CCD) type image sensors and Complementary metal-oxide-semiconductor (CMOS) type image sensors. The lens 144 is located in the aperture 134 of the rotatable housing 106 and functions to pass light from outside of the camera 100 to the image sensor 142 such that it is incident upon the sensing elements of the image sensor 142. The lens 144 may include optical properties that focus or direct the light in a desired manner. The lens 144 may be a lens assembly that includes multiple lenses that cooperate to pass light to the image sensor 142.

The image sensor 142 is controlled by a camera control module 146 that is located in the primary housing 104. A first electrical connector 148 connects the camera control module 146 to the image sensor 142 for transmission of signals and power between the camera control module 146 and the image sensor 142. The first electrical connector 148 is routed through the wiring path 130 to allow rotation of the rotatable housing 106 and the image sensor 142 while the camera control module 146 is electrically connected to the camera control module 146.

The camera control module 146 includes a processor that controls the image sensor 142 and its functions, includes memory for executing program instructions and processing data, and includes a storage device for storage of still images and/or video captured using the image sensor 142. The camera control module 146 further includes an input/output interface, which may be wired or wireless. The input output interface allows still images and/or video to be retrieved from the camera control module 146 by a remote device, and allows control of camera functionality by a remote device including initiating capture of still images and/or video.

To power the camera control module 146, the image sensor 142, and other components of the camera 100, a battery 150 is disposed in the primary housing 104 and is connected to the camera control module by a second electrical connector 152. Any conventional type of battery may be utilized. As an example, the battery 150 may be a rechargeable battery, with charging and battery regulation functions performed by the camera control module 146 using power from an external power source (not shown) using a wired or wireless connection.

To cause rotation of the rotatable housing 106 relative to the primary housing 104, a drive mechanism 154 is disposed in the primary housing and is connected to the camera control module 146 by a third electrical connector 156. As examples, the drive mechanism 154 may include a servomotor or a stepper motor. The drive mechanism 154 has an output part 158 that is engaged with or connected to the rotatable housing 106 to cause rotation of the rotatable housing 106. The drive mechanism 154 causes motion of the output part 158 in response to signals and/or data received from the camera control module 146, such as an instruction to move to a specified angle, to move over a time period (e.g., until a signal ceases), or to move in any other suitable manner. The instructions transmitted to the drive mechanism 154 from the camera control module 146 may be transmitted in response to instructions received from an external device, such as a controller or user interface that receives inputs from a human operator, previously stored instructions, or programmatically generated instructions.

Figure 7:
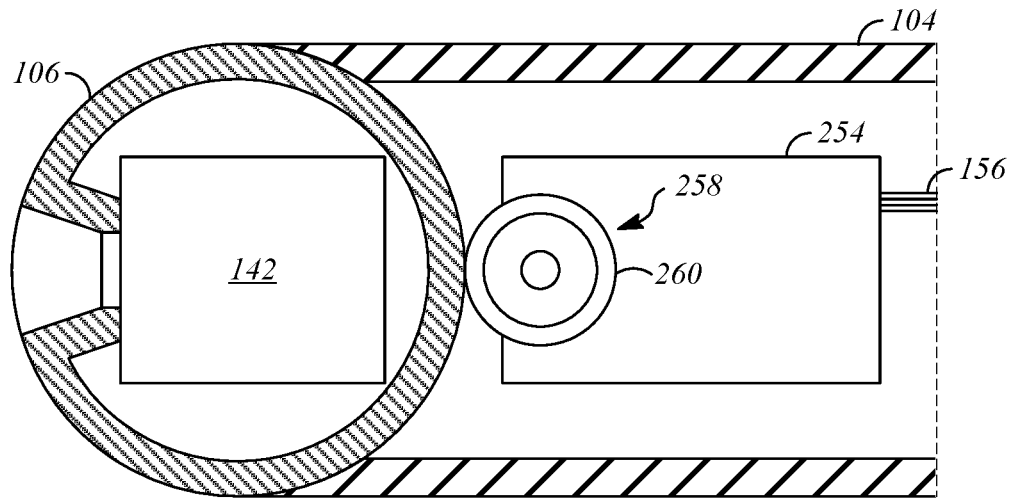
FIG. 7 is top-down cross-section view showing the camera including a drive mechanism according to one implementation taken along line 7-7 of FIG. 2.

FIG. 7 is top-down cross-section view showing the camera 100 including a drive mechanism 254 according to a first alternative implementation. The drive mechanism 254 is operable to cause rotation of an annular output part 258, such as a wheel. The annular output part 258 has a periphery 260 that is formed from a high friction material, such as rubber, and engages the exterior surface 132 of the rotatable housing 106. Frictional engagement of the periphery 260 of the annular output part 258 with the exterior surface 132 of the rotatable housing 106 causes rotation of the rotatable housing 106 in response to rotation of the annular output part 258 of the drive mechanism 254.

Figure 8:
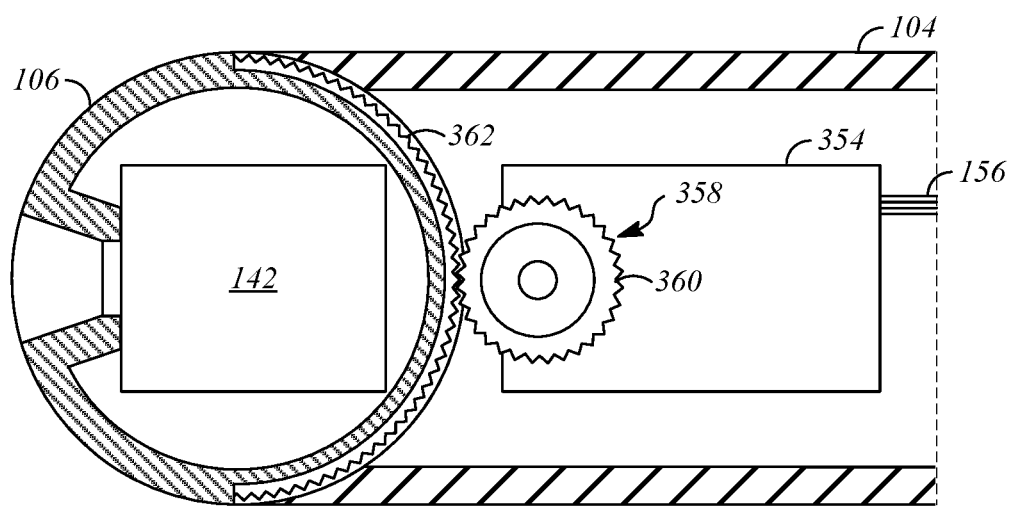
FIG. 8 is top-down cross-section view showing the camera including a drive mechanism according to another implementation taken along line 7-7 of FIG. 2.

FIG. 8 is top-down cross-section view showing the camera 100 including a drive mechanism 354 according to a second alternative implementation. The drive mechanism 354 is operable to cause rotation of an output part in the form of a gear 358. The gear 358 has a plurality of gear teeth 360. The gear teeth 360 engage a gear track 362 that is formed on the exterior surface 132 of the rotatable housing 106 to cause rotation of the rotatable housing 106 in response to rotation of the gear 358 of the drive mechanism 354.

Figure 9:
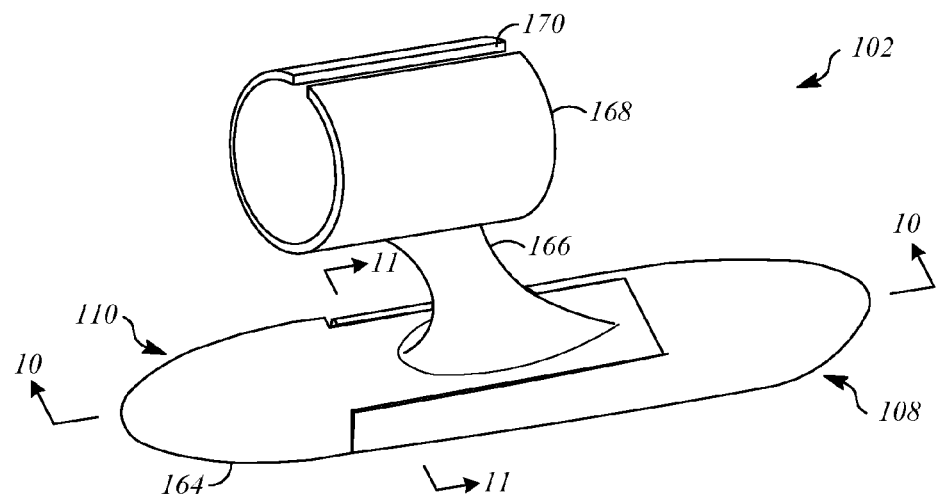
FIG. 9 is a perspective view showing the mounting assembly.
Figure 10:
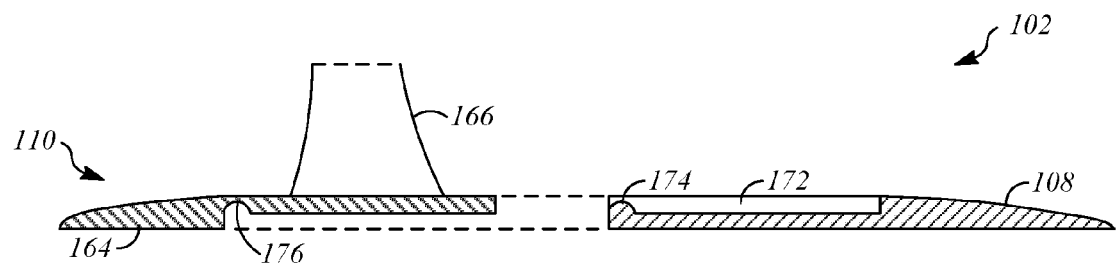
FIG. 10 is an exploded cross-section view showing the mounting assembly taken along line 10-10 of FIG. 9.
Figure 11:
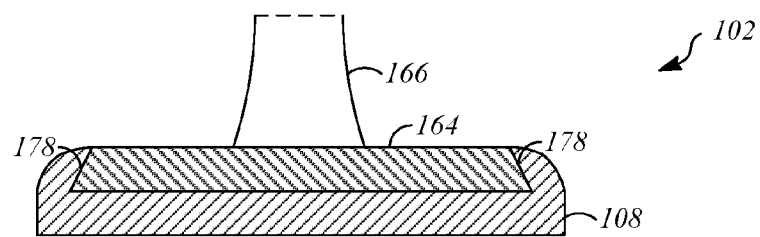
FIG. 11 is a cross-section view showing the mounting assembly taken along line 11-11 of FIG. 9.

FIGS. 9-11 show the mounting assembly 102. The base part 108 is intended to be connected to an external structure, such as a vehicle, by conventional means such as fasteners or adhesives. To reduce vibrations, a soft material can be disposed between the base part 108 and the external structure, and or can be incorporated on the bottom surface of the base part 108. The connecting part 110 includes a bottom portion 164, an intermediate portion 166, and a collar 168. The bottom portion 164 is connectable to the base part 108. As best seen in FIG. 10, part of the bottom portion 164 is received in a track 172 that is formed on the base part 108 such that the bottom portion 164 is partially disposed in the track 172 of the base part 108 in a connected position. To maintain the base part 108 and the bottom portion 164, corresponding retaining features are formed on the base part 108 and the bottom portion 164, such as a projection 174 the extends upward from the track 172 of the base part 108 and a corresponding groove 176 on the bottom portion 164 that is engageable with the projection 174 to resist disconnection of the bottom portion 164 from the base part 108, but to allow disconnection and movement of the bottom portion 164 and the base part 108 to a disconnected position upon application of a sufficient force to the connecting part 110. As shown in FIG. 11, the bottom portion 164 may be retained in the track 172 by undercuts 178 formed along the lateral sides of the track 172. To reduce vibrations, a soft material can be disposed between the base part 108 and the connecting part 110.

With further reference to FIG. 9, the intermediate portion 166 extends upward from the bottom portion 164 to the collar 168. The collar 168 is adapted to connected to the primary housing 104 and to be disposed in the annular depression 113 such that the primary housing 104 and the collar 168 cooperate to define a smooth cylindrical surface along and adjacent to the connection between the primary housing 104 and the mounting assembly 102. The collar 168 may have a split collar configuration defined by a longitudinally extending opening 170. The collar 168 may be formed from a material that is sufficiently flexible to allow the opening 170 to be widened to accept the primary housing 104 and subsequently return to its original configuration to surround and engage the primary housing 104. In particular, the collar 168 may be formed from a material that has a higher degree of flexibility that a material that the primary housing 104 is formed from. Forming the collar 168 from a flexible material also serves to absorb vibrations to further isolate the image sensor 142 from vibrations.

Figure 12:
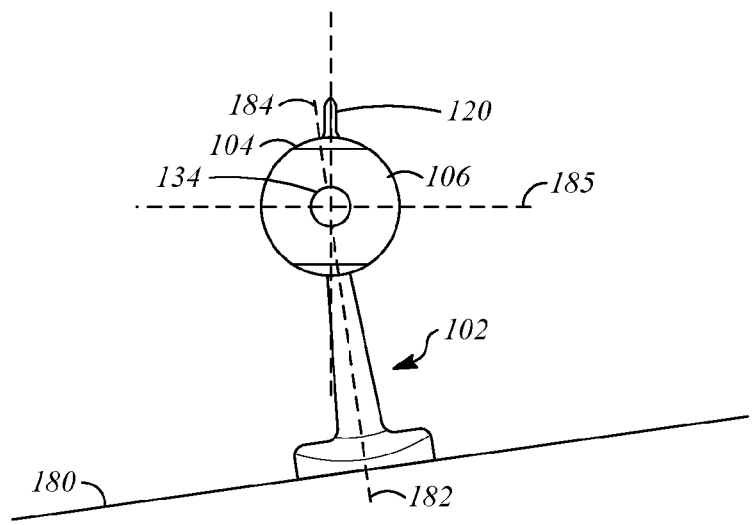
FIG. 12 is a front view showing the camera mounted to a surface.

FIG. 12 is a front view showing the camera 100 mounted to a surface 180. The surface 180 is non-horizontal in the side-to-side direction of the camera 100. The mounting assembly 102 is connected to the surface 180 and, as installed in the example shown in FIG. 12, extends upward from the surface 180 along a mounting axis 182 that is non-vertical in the side-to-side direction of the camera 100.

The image sensor 142 (not shown in FIG. 12) has an up/down optical axis 184 and a left/right optical axis 186 that correspond to X and Y dimensions of the images produced by the image sensor 142. As used herein, the term "optical axis" refers to an orthogonal direction along which successive picture elements (i.e. pixels) generated by the image sensor 142 are arrayed.

The fin 118 is configured, in the illustrated example, such that it extends outward from the exterior of the primary housing 104 of the camera 100 in the direction of the up/down optical axis 184. This configuration and alignment allows the fin 118 to serve as a visible indicator of the up/down optical axis 186 without comprising the aerodynamics of the primary housing 104 of the camera 100, since the fin 118 is configured to produce minimal aerodynamic drag. Aerodynamic structures such as fins may additionally or alternatively be used to indicate the direction of the left/right optical axis 186.

A user of the camera 100 may wish to adjust the angles of the up/down optical axis 184 and the left/right optical axis 186. For example, the user may wish to align the left/right optical axis 186 such that it is generally horizontal. To adjust the alignment of the up/down optical axis 184 and the left/right optical axis 186, the user may rotate the primary housing 104 relative to the collar 168 of the mounting assembly 102 until a desired angular orientation is reached, as indicated by the fin 118.

Figure 13:
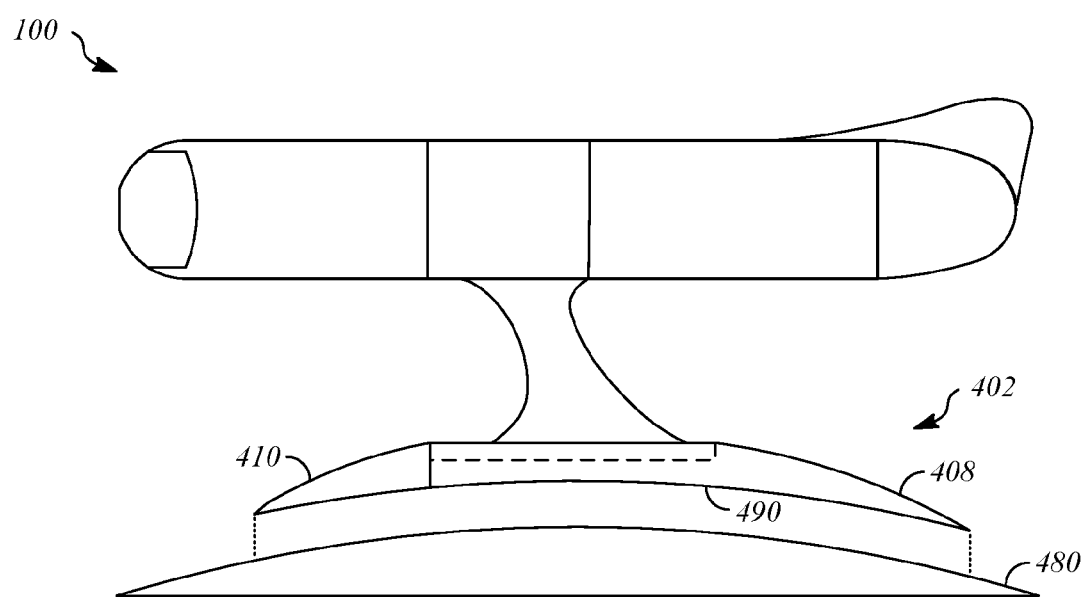
FIG. 13 is a side view showing the camera positioned for connection to a surface.

FIG. 13 is a side view showing the camera 100 positioned for connection to a surface 480. The surface 480 is contoured, such as by being curved, and therefore is non-planar. The surface 480 could be, for example, an exterior surface of a helmet. To allow connection to the surface 480, a mounting assembly 402 is utilized. The mounting assembly 402 is similar to the mounting assembly 102 except for formation of a contoured surface 490 on the bottom of a base part 408 and a connecting part 410 of the mounting assembly 402. The shape of the contoured surface 490 is complementary to the shape of the surface 480, to allow connection of the mounting assembly 402 to the contoured surface 490. In one implementation, the contoured surface 490 has a fixed shape and is formed from a substantially rigid material. In another implementation, the contoured surface 490 is formed from a flexible material and the shape of the contoured surface 490 can be adjusted to match the shape of the surface 480.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A camera, comprising:
   a primary housing that has a cylindrical exterior surface, an opening located at a front end, an upper projection, a lower projection, a first mounting structure that extends downward from the upper projection, and a second mounting structure that extends upward from the lower projection;
   a rotatable housing that has a spherical exterior surface and an aperture, wherein the rotatable housing is disposed in the opening of the primary housing below the upper projection and above the lower projection and is rotatably mounted to the primary housing, wherein the first mounting structure of the primary housing extends into a first opening of the rotatable housing and engages a first annular surface of the rotatable housing and a second mounting structure of the primary housing extends into a second opening of the rotatable housing and engages a second annular surface of the rotatable housing; and
   an image sensor that is located in the rotatable housing for rotation in unison with the rotatable housing, wherein the image sensor receives light through the aperture of the rotatable housing.

2. The camera of claim 1, wherein the rotatable housing and the primary housing are configured to provide a smooth geometric transition at the opening of the primary housing.

3. The camera of claim 1, wherein the primary housing and the rotatable housing cooperate to define a hemispherical shape.

4. The camera of claim 1, wherein the rotatable housing is rotatable on a rotation axis that extends through the upper projection and the lower projection.

5. The camera of claim 4, wherein the primary housing extends longitudinally along a housing axis and the rotation axis extends transverse to the housing axis.

6. A camera, comprising:
   a primary housing that has a cylindrical exterior surface, an opening located at a front end, an upper projection having a first mounting structure that extends downward into the opening, and a lower projection having a second mounting structure that extends upward into the opening;
   a rotatable housing that has a spherical exterior surface and an aperture, wherein the rotatable housing is disposed in the opening of the primary housing below the upper projection and above the lower projection and is rotatably mounted to the primary housing;
   an image sensor that is located in the rotatable housing for rotation in unison with the rotatably housing, wherein the image sensor receives light through the aperture of the rotatable housing;
   a camera control module;
   a first electrical connector that connects the camera control module to the image sensor; and
   a wiring route that is formed in the primary housing and extends through at least one of the first mounting structure or the second mounting structure.

7. The camera of claim 1, further comprising:
   a drive mechanism that is located in the primary housing and is operable to cause rotation of the rotatable housing relative to the primary housing.

8. The camera of claim 7, wherein the drive mechanism includes a wheel that is frictionally engaged with the spherical exterior surface of the rotatable housing.

9. A camera, comprising:
   a primary housing that has a cylindrical exterior and an opening located at a front end;
   a rotatable housing that has a spherical exterior surface and an aperture, wherein the rotatable housing is disposed in the opening of the primary housing and is rotatably mounted to the primary housing;
   an image sensor that is located in the rotatable housing for rotation in unison with the rotatable housing, wherein the image sensor receives light through the aperture of the rotatable housing; and
   a drive mechanism that is located in the primary housing and is operable to cause rotation of the rotatable housing relative to the primary housing, wherein the drive mechanism includes a gear that is frictionally engaged with a gear track that is formed on the spherical exterior surface of the rotatable housing.

10. A camera, comprising:
    a primary housing that has a cylindrical exterior surface and an opening located at a front end:
    a rotatable housing that has a spherical exterior surface and an aperture, wherein the rotatable housing is disposed in the opening of the primary housing and is rotatably mounted to the primary housing;
    an image sensor that is located in the rotatable housing for rotation in unison with the rotatable housing, wherein the image sensor receives light through the aperture of the rotatable housing; and
    a mounting assembly that includes a base part and a connecting part that is movable between a connected position and a disconnected position with respect to the base part, wherein the connecting part includes a collar that is receivable in an annular depression that is formed in the cylindrical exterior surface of the primary housing.

11. The camera of claim 10, wherein the mounting assembly includes a contoured surface having a shape that is complementary to the shape of a non-planar surface for allowing connection of the mounting assembly to the non-planar surface.

12. The camera of claim 10, wherein a structure extends outward from the cylindrical exterior surface of the primary housing a direction that corresponds to an optical axis of the image sensor to provide a visible indication of the direction of the optical axis and allow alignment of the image sensor by rotating the primary housing relative to the collar of the connecting part of the mounting assembly.

13. The camera of claim 10, wherein the collar has a split configuration defined by a longitudinally extending opening, and the collar is formed from a first material that is flexible to allow the longitudinally extending opening to be widened for connection or disconnection of the collar relative to the primary housing.

14. The camera of claim 13, wherein the primary housing is formed from a second material that is less flexible than the first material.

15. The camera of claim 14, wherein the first material is configured to absorb vibrations.

16. The camera of claim 6, further comprising:
    a drive mechanism that is located in the primary housing and is operable to cause rotation of the rotatable housing relative to the primary housing.

17. The camera of claim 16, wherein the drive mechanism includes a wheel that is frictionally engaged with the spherical exterior surface of the rotatable housing.

18. The camera of claim 6, wherein the spherical exterior surface of the rotatable housing and the cylindrical exterior surface of the primary housing cooperate to provide a smooth geometric transition at the opening of the primary housing without abrupt angular deviations.

19. The camera of claim 6, wherein the rotatable housing, the upper projection of the primary housing, and the lower projection of the primary housing cooperate to define a hemispherical shape.

20. The camera of claim 1, wherein a structure extends outward from the cylindrical exterior surface of the primary housing a direction that corresponds to an optical axis of the image sensor to provide a visible indication of the direction of the optical axis.

* * * * *